(12) United States Patent
Eckstein et al.

(10) Patent No.: US 8,676,369 B2
(45) Date of Patent: Mar. 18, 2014

(54) METHOD FOR MONITORING A PRODUCTION PROCESS

(75) Inventors: Martin Eckstein, Puchheim (DE); Guenter Breitkopf, Munich (DE)

(73) Assignee: MTU Aero Engines GmbH, Munich (DE)

( * ) Notice: Subject to any disclaimer, the term of this patent is extended or adjusted under 35 U.S.C. 154(b) by 813 days.

(21) Appl. No.: 12/377,241

(22) PCT Filed: Aug. 4, 2007

(86) PCT No.: PCT/DE2007/001393
§ 371 (c)(1),
(2), (4) Date: Jun. 4, 2010

(87) PCT Pub. No.: WO2008/019654
PCT Pub. Date: Feb. 21, 2008

(65) Prior Publication Data
US 2010/0241265 A1    Sep. 23, 2010

(30) Foreign Application Priority Data
Aug. 12, 2006 (DE) .......................... 10 2006 037 952

(51) Int. Cl.
*G06F 19/00* (2011.01)
(52) U.S. Cl.
USPC ........... 700/110; 700/109; 700/159; 700/160; 700/182; 700/187
(58) Field of Classification Search
USPC .......... 700/109, 159, 160, 182, 187; 706/904, 706/912
See application file for complete search history.

(56) References Cited

U.S. PATENT DOCUMENTS

| | | | | |
|---|---|---|---|---|
| 3,603,184 A | * | 9/1971 | Berly | 82/11.5 |
| 3,762,231 A | * | 10/1973 | Pettigrew | 474/28 |
| 3,970,830 A | * | 7/1976 | White et al. | 700/187 |
| 4,045,917 A | * | 9/1977 | Loos et al. | 451/275 |
| 4,060,709 A | * | 11/1977 | Hanson | 219/130.33 |
| 4,134,210 A | * | 1/1979 | Scholl et al. | 33/23.08 |
| 4,165,200 A | * | 8/1979 | Taylor | 408/118 |
| 4,207,567 A | * | 6/1980 | Juengel et al. | 340/680 |
| 4,251,872 A | * | 2/1981 | Bone | 700/175 |
| 4,279,013 A | * | 7/1981 | Cameron et al. | 700/33 |
| 4,366,424 A | * | 12/1982 | McKechnie | 318/568.1 |
| 4,570,217 A | * | 2/1986 | Allen et al. | 700/83 |
| 4,611,296 A | * | 9/1986 | Niedermayr | 700/260 |
| 4,642,618 A | * | 2/1987 | Johnson et al. | 340/683 |
| 4,780,960 A | * | 11/1988 | Merz | 33/17 R |
| 4,847,792 A | * | 7/1989 | Barna et al. | 702/182 |

(Continued)

*Primary Examiner* — Kavita Padmanabhan
*Assistant Examiner* — Thomas Stevens
(74) *Attorney, Agent, or Firm* — Crowell & Moring LLP

(57) ABSTRACT

A method for monitoring a production process with regard to quality is disclosed. The method includes: a) breaking down the production process into a sequence of individual steps, defined by a sequence of control commands for a production program for carrying out the production process on a machine tool; b) generating at least one signal template per individual step of the production process from the control commands for the individual steps, each signal template corresponding to a theoretical signal curve for a parameter which may be measured upon executing the production process; c) measurement of a signal curve for at least one parameter per individual step during the execution; and d) comparison of the or each measured signal curve with the respective arithmetically generated signal template, wherein a qualitatively poor production process is determined if the measured signal curve deviates from the signal template by more than a given tolerance.

8 Claims, 1 Drawing Sheet

(56) References Cited

U.S. PATENT DOCUMENTS

| | | | |
|---|---|---|---|
| 5,172,326 A * | 12/1992 | Campbell et al. | 700/134 |
| 5,189,624 A * | 2/1993 | Barlow et al. | 700/169 |
| 5,251,144 A * | 10/1993 | Ramamurthi | 700/177 |
| 5,384,697 A * | 1/1995 | Pascucci | 700/10 |
| 5,521,985 A * | 5/1996 | Camp et al. | 382/176 |
| 5,586,041 A | 12/1996 | Mangrulkar | |
| 5,706,684 A * | 1/1998 | Gong et al. | 72/42 |
| 5,777,880 A * | 7/1998 | Bowen et al. | 700/143 |
| 5,838,918 A * | 11/1998 | Prager et al. | 709/221 |
| 5,956,251 A * | 9/1999 | Atkinson et al. | 700/109 |
| 6,033,226 A * | 3/2000 | Bullen | 434/219 |
| 6,108,662 A * | 8/2000 | Hoskins et al. | 700/95 |
| 6,134,541 A * | 10/2000 | Castelli et al. | 1/1 |
| 6,154,684 A * | 11/2000 | Schwenke et al. | 700/159 |
| 6,477,432 B1 * | 11/2002 | Chen et al. | 700/51 |
| 6,516,237 B1 * | 2/2003 | Aoki et al. | 700/95 |
| 6,751,851 B2 * | 6/2004 | Ninomiya et al. | 29/718 |
| 7,110,956 B1 * | 9/2006 | Drake et al. | 705/7.37 |
| 7,595,869 B1 * | 9/2009 | Tian et al. | 356/237.4 |
| 7,933,679 B1 * | 4/2011 | Kulkarni et al. | 700/173 |
| 2002/0062204 A1 * | 5/2002 | Nakajima | 702/150 |
| 2002/0173935 A1 * | 11/2002 | Miura | 702/182 |
| 2004/0039488 A1 * | 2/2004 | Junk et al. | 700/282 |
| 2005/0084144 A1 * | 4/2005 | Feldman | 382/128 |
| 2005/0278670 A1 * | 12/2005 | Brooks et al. | 716/5 |
| 2007/0046677 A1 * | 3/2007 | Hong et al. | 345/442 |

* cited by examiner

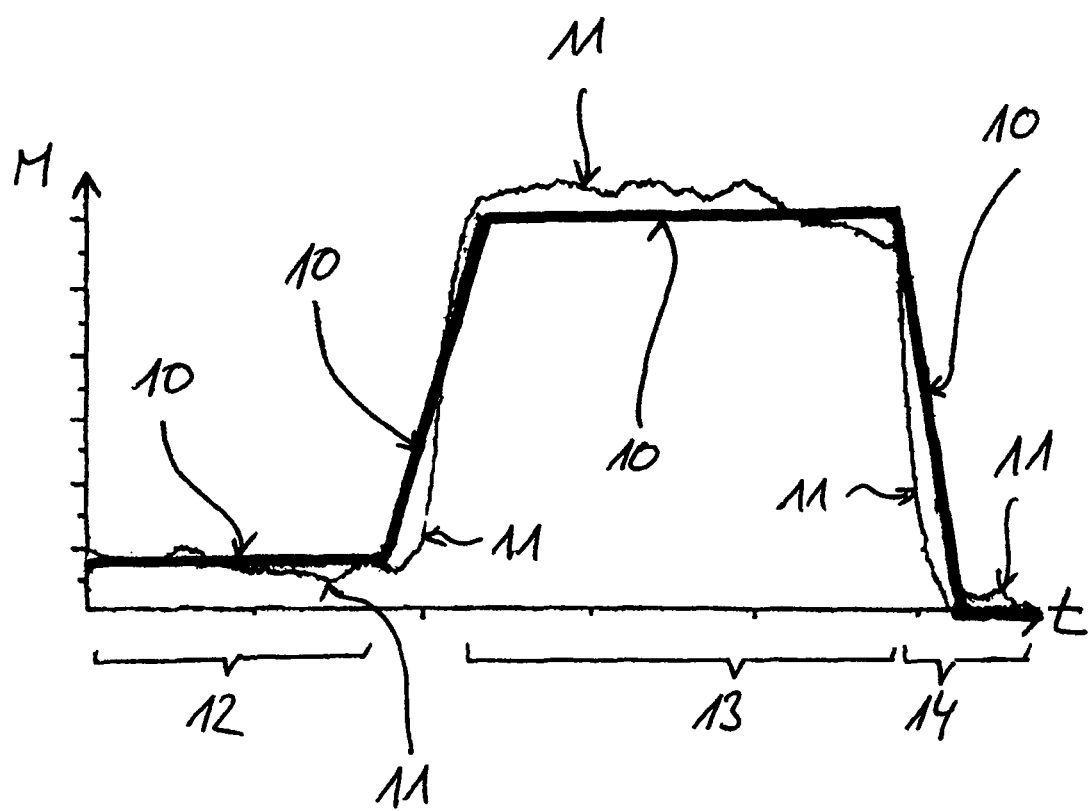

METHOD FOR MONITORING A PRODUCTION PROCESS

BACKGROUND AND SUMMARY OF THE INVENTION

This application claims the priority of International Application No. PCT/DE2007/001393, filed Aug. 4, 2007, and German Patent Document No. 10 2006 037 952.7, filed Aug. 12, 2006, the disclosures of which are expressly incorporated by reference herein.

The invention relates to a method for monitoring a production process with regard to quality.

The quality of components that are manufactured with the aid of a production process influences to a great degree the performance characteristics of the components. This applies particularly to highly stressed components of a gas turbine aircraft engine. In this connection, the quality of the components relates especially to the dimensional stability, the static and dynamic strength as well as to the surface quality of the components. It is possible only with great effort to test the quality of manufactured components in a non-destructive manner. As a result, methods for monitoring a production process that make it possible to determine the quality of the manufactured components are of interest.

Methods for monitoring a production process with regard to quality are known from practice in which signal curves of parameters of the production process are recorded using measuring techniques, wherein several signal curves that are recorded using measuring techniques, which can be allocated to a correct and therefore qualitatively high-value production sequence, are statistically analyzed in order to make target curves available for the signal curves that can be recorded using measuring techniques. To monitor a production process with regard to quality, actual curves of the signal curves that have been recorded using measuring techniques are compared with the target curves determined in advance for same, wherein a qualitatively poor production process is determined if the actual curves deviate from the target curves by more than a defined extent. According to the prior art, several actually measured signal curves of correct or qualitatively good production sequences are accordingly required to make the target curves available for the signal curves that can be recorded using measuring techniques in order to determine herefrom the target curves with the aid of stochastic analyses, i.e., by notification about the measurements that are therewith significant. However, if components are supposed to be manufactured in small lot sizes, the procedure for monitoring a production process with regard to quality that is known from practice is unsuitable.

Starting herefrom, the present invention is based on the objective of creating a method for monitoring a production process with regard to quality, which also makes monitoring in the case of small lot sizes possible.

The inventive method comprises at least the following steps: a) breaking down the production process into a sequence of individual steps, defined by a sequence of control commands for a production program for carrying out the production process on a machine tool; b) generating at least one signal template per individual step of the production process from the control commands for the individual steps, each signal template corresponding to a theoretical signal curve for a parameter which may be measured upon executing the production process; c) measurement of a signal curve for at least one parameter per individual step during the execution; d) comparison of the or each measured signal curve with the respective arithmetically generated signal template, wherein a qualitatively poor production process is determined if the measured signal curve deviates from the signal template by more than a given tolerance.

In terms of the inventive method, it is provided that the production process being monitored with respect to its quality be subdivided into a sequence of individual steps, wherein at least one signal template is arithmetically generated for each individual step from the control commands of the individual steps.

The signal templates provide target curves for signal curves of parameters of the production process, wherein, according to the invention, these signal templates are theoretically, arithmetically determined target curves and not, as in the prior art, target curves generated from real signal curves via statistical analyses. The advantage of this is that the inventive method may also be used for monitoring a production process with regard to quality if components with relatively small lot sizes are supposed to be manufactured with the production process being monitored.

The tolerance of each signal template is preferably defined by an upper limit and lower limit enveloping the theoretic signal curve, wherein the upper limit and lower limit along with the signal template are generated from the control commands of the individual steps.

According to an advantageous further development of the invention, signal templates as well as preferably corresponding upper limits and lower limits, which can be detected without additional sensors on the machine tool, are generated for these types of parameters.

Preferred further developments of the invention are disclosed in the following description. Without being limited hereto, exemplary embodiments of the invention are explained on the basis of the drawing.

BRIEF DESCRIPTION OF THE DRAWING

FIG. 1 is a diagram with a signal template generated for an individual step of drilling and with a corresponding, measured signal curve.

DETAILED DESCRIPTION OF THE DRAWING

The present invention relates to a method for monitoring a production process with regard to quality, in particular a metal-cutting production process. The invention will be described in the following for the case that the production process being monitored is drilling.

In terms of the present invention, the production process being monitored is broken down or subdivided into a sequence of individual steps, wherein the individual steps are defined by a sequence of control commands for a production program for carrying out the production process on a machine tool. In this case, the production program is an NC program in particular. If drilling as the production process is monitored with respect to the parameters related to quality, then the production process of drilling is preferably subdivided into the individual steps of center drilling, predrilling, counterboring, finish counterboring and deburring, wherein in the case of deburring a differentiation is made between deburring on the upper side of drilled holes and deburring on the under side of drilled holes.

At least one signal template respectively is generated for each of the individual steps of the production process being monitored, wherein each signal template is arithmetically and therefore theoretically generated from the control commands of the production program for the respective individual step, as well as from the respective tool, the material used and the machine specifications, and wherein each signal template corresponds to a theoretic signal curve or target curve of a parameter that can be recorded using measuring techniques when executing the production process.

FIG. 1 depicts, for the individual step of predrilling in the production process of drilling, an arithmetically generated signal template 10 or a theoretic signal curve from the control commands of the production program or NC program over the time t for a torque M that can be recorded using measuring techniques of a motor of the machine tool.

To monitor a production process, signal curves or actual curves are recorded using measuring techniques during the execution of the individual steps of the production process, and namely for the parameters for which the signal templates were arithmetically generated from the control commands of the production program.

The or each measured signal curve is then compared with the respectively arithmetically generated signal template, wherein a qualitatively poor production process is determined if the measured signal curve deviates from the signal template by more than a given tolerance.

In additional to the arithmetically determined signal template 10, FIG. 1 also depicts a measured signal curve 11 for the corresponding parameter of the signal template 10, namely for the torque M of a motor of the machine tool.

According to an advantageous further development of the invention method, the tolerance of each signal template is defined by an upper limit and lower limit enveloping the theoretic signal curve, wherein the upper limit and the lower limit along with the signal template are arithmetically and therefore theoretically generated from the control commands of the individual steps. Because of a desire for a simpler representation, FIG. 1 does not show an upper limit and lower limit enveloping the signal template 10.

The signal templates can be calculated for those parameters for which separate sensors are required (torques, forces, paths, oscillation levels), however, for such parameters of the production process being monitored, signal templates as well as upper limits and lower limits for the signal templates are preferably generated, which can be recorded without additional sensors on the machine tool. Such a parameter is, for example, the power consumption of a motor of the machine tool, which can be obtained directly from the electronics of the machine tool. In this case it is possible to dispense with additional sensors, making it possible to implement the method in an especially cost-effective and simple manner.

The signal template of each individual step can be subdivided into sections that are relevant to manufacturing or with regard to quality, wherein monitoring is concerned in particular with making sure that the measured signal curve in these sections related to quality does not deviate from the signal template by more than a given tolerance.

In FIG. 1, the signal template 10 for the individual step of predrilling in the production process of drilling can be subdivided into, for example, sections 12, 13 and 14 that are relevant in terms of quality, wherein section 12 is a so-called air section, section 13 is the stationary predrilling and section 14 is a stress-relief cycle. An individual tolerance and therefore an individual upper limit and lower limit can be defined for each of these sections.

As already mentioned, a qualitatively poor production process is determined if the measured signal curve deviates from the arithmetically determined signal template by more than a given tolerance. The production process is then preferably aborted.

As a result, the arithmetically determined signal template serves as the target signal curve of a measured parameter of an individual step of the production process being monitored, wherein this signal template serving as the target signal curve is compared with an actual signal curve of the parameter that is recorded using measuring techniques.

The comparison of the arithmetically determined signal templates with the signal curves recorded using measuring techniques preferably takes place in real time, but may also be carried out offline.

The inventive method is especially suitable if sensors used to measure the signal curves supply a signal with a high noise component. Arithmetically generated signal templates are less critical with respect to signal curves with a high noise component that are recorded using measuring techniques.

The invention claimed is:

1. A method for monitoring a production process with regard to quality, comprising the steps of:
   a) breaking down the production process into a sequence of individual steps, defined by a sequence of control commands for a production program for carrying out the production process on a machine tool;
   b) generating a signal template per individual step of the production process from the control commands for the individual steps, each signal template corresponding to a theoretical signal curve for a parameter which is measurable upon executing the production process, wherein a tolerance of each signal template is defined by an upper limit and lower limit enveloping the theoretical signal curve and wherein the upper limit and lower limit along with the signal template are generated from the control commands of the individual steps;
   c) measurement of a signal curve for the parameter per individual step during execution of the production process; and
   d) comparison of a measured signal curve with a respective signal template, wherein a qualitatively poor production process is determined if the measured signal curve deviates from the respective signal template by more than the tolerance.

2. The method according to claim 1, wherein the production process is a metal-cutting process.

3. The method according to claim 2, wherein the metal cutting process is a drilling process.

4. The method according to claim 3, wherein the drilling process is subdivided into the individual steps of center drilling, predrilling, counterboring, finish counterboring and deburring.

5. The method according to claim 1, wherein signal templates for parameters which are measurable without additional sensors on the machine tool are generated for the parameters.

6. The method according to claim 5, wherein a signal template is generated for a parameter of a power consumption of a motor of the machine tool.

7. The method according to claim 1, wherein the signal template of each individual step is subdivided into sections.

8. The method according to claim 1, wherein when the measured signal curve deviates from the respective signal template by more than the given tolerance, the production process is aborted.

* * * * *